W. R. HILL.
FLYWHEEL ATTACHMENT.
APPLICATION FILED MAY 23, 1919. RENEWED JAN. 25, 1922.

1,409,109.

Patented Mar. 7, 1922.

Witnesses
R. A. Thomas

Inventor
W. R. Hill.
By Victor J. Evans
Attorney

UNITED STATES PATENT OFFICE.

WILLIAM R. HILL, OF VERDI, MINNESOTA.

FLYWHEEL ATTACHMENT.

1,409,109.  Specification of Letters Patent.  Patented Mar. 7, 1922.

Application filed May 23, 1919, Serial No. 299,130.  Renewed January 25, 1922. Serial No. 531,819.

*To all whom it may concern:*

Be it known that I, WILLIAM R. HILL, a citizen of the United States, residing at Verdi, in the county of Lincoln and State of Minnesota, have invented new and useful Improvements in Flywheel Attachments, of which the following is a specification.

This invention comprehends the provision of a fly wheel attachment, by means of which the same can be readily converted into a carborundum wheel.

The nature and advantages of the invention will be better understood when the following detail description is taken in connection with the accompanying drawing, the invention residing in the construction, combination and arrangement of parts as claimed.

In the drawing forming part of this specification, like numerals of reference indicate similar parts in the several views, and wherein:—

Figure 1:
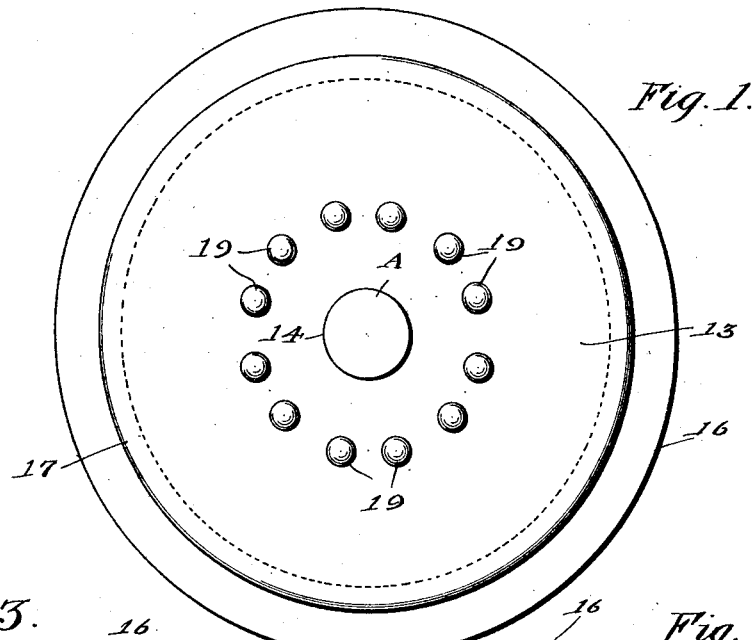
Figure 1 is a view looking from one side of the wheel showing the attachment associated therewith.
Figure 3:
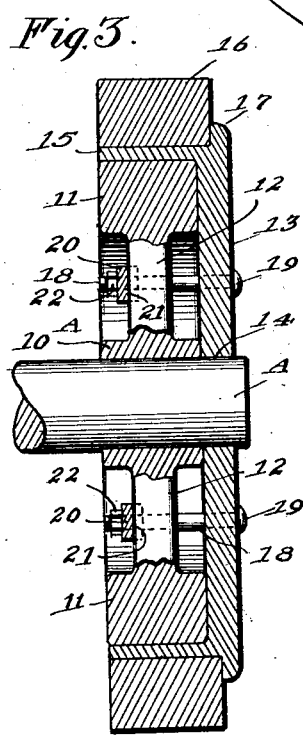
Figure 3 is a sectional view taken on line 3—3 of Figure 1.
Figure 2:
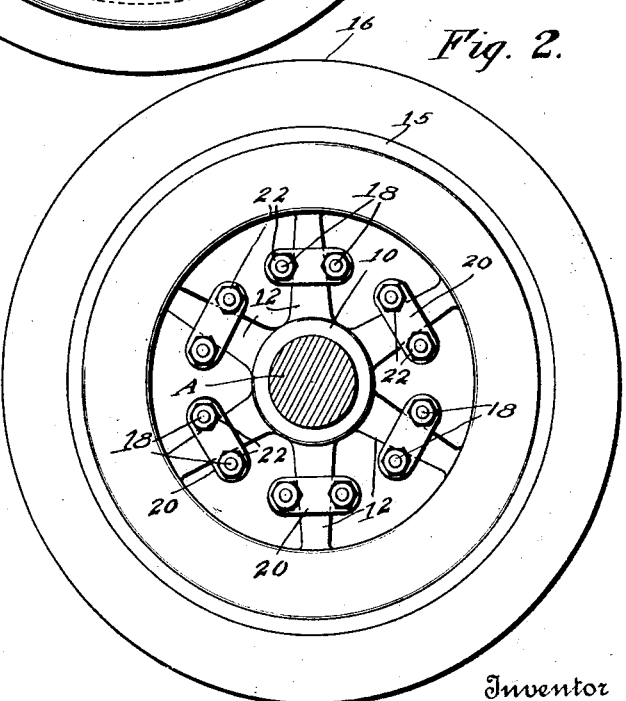
Figure 2 is a similar view looking from the opposite side of the wheel.

Referring more particularly to the drawings in detail, A indicates a fly wheel of usual construction, including a hub 10, felly 11 and spokes 12. The attachment forming the subject matter of my invention embodies a disk 13 having a central opening 14 to receive one end of a shaft A upon which the fly wheel is mounted. Projecting laterally from one side of the disk 13 is an annular flange 15 which supports a carborundum ring 16, the latter being held in place by means of an annular flange 17 disposed at right angles to the flange 15 and bearing against the outer side of the carborundum ring as shown.

Carried by the disk 13 and projecting therefrom in the direction of the flange 15 is a plurality of threaded elements 18, said elements being arranged in pairs and having heads 19 engaging the outer surface of the disk. Associated with each pair of elements 18 is a clamping plate 20 which has openings adjacent its opposite ends to receive the elements 18, the clamping plates between the openings therein being grooved as at 21 to permit the plate to accommodate itself to one of the spokes 12. There may be any number of clamping plates provided, preferably one for each spoke of the fly wheel. Nuts 22 are in threaded engagement with the element 18 so as to hold the plate in clamping position.

In practice, when it is desired to convert the fly wheel into a carborundum wheel, the disk 13 together with the carborundum ring as a unit is associated with the fly wheel, by removing the clamping plate 20 from the elements 18, and then placing the flange 15 about the periphery of the wheel, during which association of parts each pair of elements 18 are disposed at opposite sides of the spokes 12 of the wheel. The clamping plates 20 are then placed upon the elements 18, one of said plates being used with each pair of elements, and when the nuts 22 are threaded upon the elements 18 the plates 20 are forced into clamping relation with the spokes 12 as will be readily understood. The attachment is very simple in construction, and may be quickly and easily attached to or removed from the wheel 11 as the occasion may require.

While I have shown and described what I consider to be the preferred embodiment of the invention, I desire to have it understood that I do not limit myself in this connection, and that such changes may be resorted to when desired as fall within the scope of what is claimed.

What I claim is:—

In combination with a fly wheel and shaft therefor, of a disk provided with an enlarged central opening surrounding said shaft and having a plurality of small spaced concentrically arranged openings formed therein, an annular flange projecting from said disk and engaging the periphery of said wheel, a carborundum ring surrounding said flange, an annular flange extending from said disk at right angles to said flange aforesaid and engaging said ring, a plurality of threaded elements extending through the openings in said disk and through said wheel, a plurality of elongated plates provided with spaced openings engaging said threaded elements and a plurality of nuts engaging the ends of said threaded elements and said plates.

In testimony whereof I affix my singature.

WILLIAM R. HILL.